United States Patent
Mauro et al.

(10) Patent No.: US 8,122,031 B1
(45) Date of Patent: Feb. 21, 2012

(54) USER LABEL AND USER CATEGORY BASED CONTENT CLASSIFICATION

(75) Inventors: Derek Mauro, Scarsdale, NY (US); Beverly Yang, Cupertino, CA (US)

(73) Assignee: Google Inc., Mountain View, CA (US)

(*) Notice: Subject to any disclaimer, the term of this patent is extended or adjusted under 35 U.S.C. 154(b) by 371 days.

(21) Appl. No.: 12/483,200

(22) Filed: Jun. 11, 2009

(51) Int. Cl.
*G06F 17/30* (2006.01)

(52) U.S. Cl. ........ 707/748; 707/727; 707/728; 707/763; 707/769

(58) Field of Classification Search ............ 707/727, 707/728, 748, 763, 769
See application file for complete search history.

(56) References Cited

U.S. PATENT DOCUMENTS

| | | | | |
|---|---|---|---|---|
| 7,680,857 B2* | 3/2010 | Vadai et al. | | 707/728 |
| 7,761,423 B1* | 7/2010 | Cohen | | 707/637 |
| 7,895,193 B2* | 2/2011 | Cucerzan et al. | | 707/721 |
| 2009/0070197 A1* | 3/2009 | Ermolli | | 705/10 |

* cited by examiner

*Primary Examiner* — Shahid Alam
*Assistant Examiner* — Andalib Lodhi
(74) *Attorney, Agent, or Firm* — Fish & Richardson P.C.

(57) ABSTRACT

Methods, program products, and systems for classifying feeds are described. A system acquires user created labels and user subscribed data feeds from a group of users. The system generates a topic-feed association rule by generating a topic-feed mapping that contains topic-feed pairs, calculating a weight for each topic-feed pair, and selecting topic-feed pairs whose weight reaches a threshold. The data feeds are classified into topics according to the topic-feed association rules. The system obtains user categories from a group of users. Using a probability model, the system matches the user subscribed data feeds with the user categories. The system further generates a topic classification, associating topics with user categories. Using the topic classification, topic-feed association rules, and a user's specific data, the system predicts a user's feeds of interest and recommends data feeds to the user accordingly.

21 Claims, 11 Drawing Sheets

| Candidate Feeds 810 | Candidate Topics 820 | User Count 830 |
|---|---|---|
| FTQN.com | Baseball | 50000 |
| | Sports | 60000 |
| | As | 3000 |
| | Giants | 1000 |
| | Yankees | 50 |
| DCT Sports Line Feed | Sports | 40000 |
| | Giants | 5000 |
| | Yankees | 2500 |

840 — Threshold = 4000
850 — Threshold = 2700
860 — Threshold = 4000, 2700

FIG. 8

USER LABEL AND USER CATEGORY BASED CONTENT CLASSIFICATION

BACKGROUND

This specification relates to classifying and recommending content to users.

The term "Web" in this specification refers to the World Wide Web ("WWW"). A Web page is a Web resource having particular content and that can be accessed through a Web browser. Some Web pages allow user customization (e.g., to personalize the page according to user interests). For example, a user can create labels and folders for content on the Web page.

The user can subscribe to feeds. A feed is a data source for providing a user with frequently updated content. A feed can refer to a Web feed or other form of content updating mechanism. For example, updated news and stock quotes can be provided by a feed.

Conventional text classification techniques assign a document or a text string to one or more classes based on the content of the document or text string. Traditional text classification techniques are not well suited for classifying feeds into hierarchical categories using user generated labels and folders.

SUMMARY

In general, one aspect of the subject matter described in this specification can be embodied in methods that include the actions of acquiring topic data from multiple users, the topic data including candidate feeds and candidate topics; generating a candidate topic-candidate feed mapping from the topic data, the candidate topic-candidate feed mapping includes candidate topic-candidate feed pairs; generating topic-feed association rules using the mapping, the topic-feed association rules identifying rules of implication between topics and feeds; and using the topic-feed association rules to recommend the feeds to a user.

These and other embodiments can optionally include one or more of the following features. Generating topic-feed association rules can further include the actions of calculating a weight of each candidate topic-candidate feed pair; applying a threshold to the each candidate topic-candidate feed pair, the threshold representing a level of confidence that in the candidate topic-candidate feed pair, the candidate topic implies the candidate feed; and selecting topic-feed pairs from the candidate topic-candidate feed pairs using the threshold and the weight of the each candidate topic-candidate feed pair.

Calculating the weight of the each candidate topic candidate feed pair can include the actions of calculating a number of users who use a homogeneous label of the candidate topic to label the candidate feed. Calculating the weight of the each candidate topic-candidate feed pair can include applying a formula $$W = C_1 W_1 + C_2 \frac{k}{k + C_3}$$

where W is the weight; W1 is a relevance weight; k is the number of times a homogeneous label under the candidate topic is applied to the candidate feed in the topic data; and C1, C2, and C3 are constants, wherein C1 and C2 are values between 0 and 1, and C3 is a positive number.

The relevance weight W1 can be calculated using formula $$W_1 = \frac{\binom{n}{k} \cdot p_t^k \cdot (1-p_t)^{n-k} \cdot p_r}{\binom{n}{k} \cdot p_t^k \cdot (1-p_t)^{n-k} \cdot p_r + \binom{n}{k} \cdot p_s^k \cdot (1-p_s)^{n-k}}$$

where n is a popularity factor; Pt is a constant that controls the confidence of positive matches; Ps is a constant that controls the confidence of negative matches; and Pr is an estimate ratio.

The popularity factor n can be calculated using formula $$n = \text{Max}(P_l, P_e, k)$$

where Pl is a popularity of the candidate topic; and Pe is popularity of the candidate feed.

The candidate topics can be extracted from user created labels.

Another aspect of the subject matter described in this specification can be embodied in methods that include the actions of acquiring topic data from a first group of users, the topic data including candidate feeds and candidate topics; generating topic-feed association rules from the topic data, the generating including selecting feeds from candidate feeds and selecting topics from candidate topics using a first threshold; acquiring categories from a second group of users; matching the categories with the selected feeds in the topic-feed association rules to create a category-feed mapping, the matching based on a probability model; generating a topic classification using the category-feed mapping and the topic-feed association rules; and using the topic classification to recommend feeds to a user.

These and other embodiments can optionally include one or more of the following features. Categories can be created from search histories of the second group of users. Matching the categories with the selected feeds can include the actions of generating a mapping between user categories and the selected feeds, the mapping including category-feed pairs; calculating a relevance factor of each category-feed pair in the mapping using the probability model; applying a second threshold to the relevance factors of the each category-feed pair; and selecting category-feed pairs using the second threshold.

Using the topic classification to recommend feeds to the user can include the actions of receiving a user profile; identifying the topics of interest of the user using the user profile, the topic classification, and the topic-feed association rules; identify one or more recommended feeds using the user's topics of interest; and displaying references to the one or more recommended feeds on a display device. The user profile can optionally include categories of the user and a geographical location of the user.

Other embodiments of these aspects include corresponding systems, apparatus, and computer program products.

Particular embodiments of the subject matter described in this specification can be implemented so as to realize one or more of the following advantages. Data feeds can be classified into fine-grained categories based on users' labels and other user specified data. The fine-grained categories allow a feed to be recommended to a user in a way that is tailored to the user's interests. For example, feed recommendations to a user can be based on the user's location. Feed recommendations to a user can be based on the names of the labels and folders that the user has created on the user's personalized page. Feed recommendations can further be based on the user's search and page view history.

The details of one or more user label and user category based content classification are set forth in the accompanying drawings and the description below. Other features, objects, and advantages of the techniques will be apparent from the description and drawings, and from the claims.

DESCRIPTION OF DRAWINGS

FIG. 8 is a diagram illustrating an example threshold to topic-feed mapping.

Like reference symbols in the various drawings indicate like elements.

DETAILED DESCRIPTION

Figure 1:
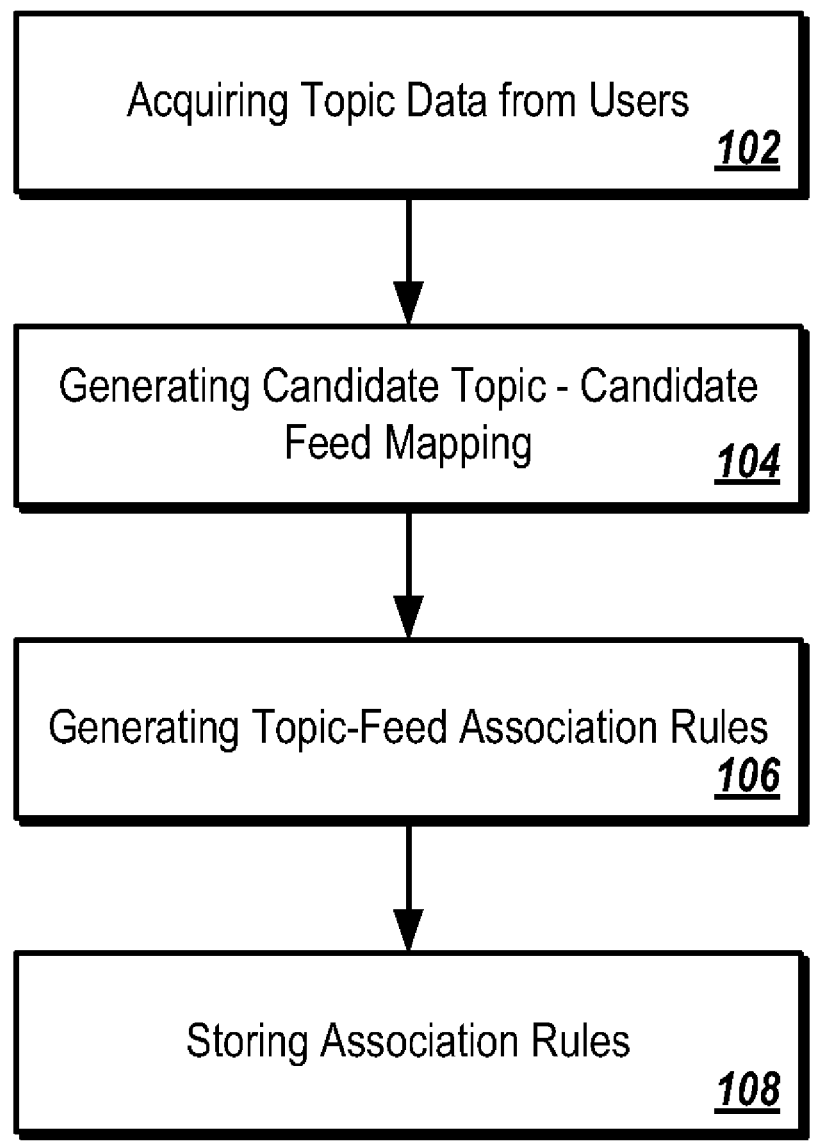
FIG. 1 is a flowchart illustrating an example method for generating topic-feed association rules.

FIG. 1 is a flowchart illustrating an example method 100 for generating topic-feed association rules. For convenience, the method 100 will be described with respect to a system that performs the method 100.

The system acquires 102 topic data from a collection of users. Topic data are information provided by the users on customized Web pages. The topic data relate to the users' feed subscriptions and labels associated with the feed subscriptions. For example, a user subscribes to a Really Simple Syndication (RSS) feed "NFL News Update." The user puts the feed under a user-defined label "Sports News." The user's topic data thus includes the RSS feed "NFL News Update" and the label "Sports News." The topic data can be acquired from each of a large collection of users. Statistically, the larger the number of users, the more precise the end result method 100 can achieve.

Topic data can include candidate feeds and candidate topics. In some implementations, candidate feeds are feeds that are subscribed to by at least one user of the collection of users (e.g., "NFL News Update"). Using a large collection of users allows topic data to be collected for a large number of feeds. A candidate feed can potentially be used to generate a topic-feed association rule if the feed and associated labels satisfy particular filtering criteria as described below.

In some implementations, candidate topics are labels that a user gives to the subscribed feeds (e.g., "Sports News"). A user can generate a label for one or more subscribed feeds.

After a label is generated, the user can add more subscribed feeds under the same label or a new label. Thus, the label can behave like a folder that contains feeds (e.g., under "Sports News," a user can have feeds "NFL News Update" and "NBA News Update."). In addition, the user can put a feed under more than one label, for example, by subscribing the feed multiple times.

In some implementations, candidate topics are derived from normalized user labels. A candidate topic can be a normalized word, phrase, or sentence that is entered by a user as a label categorizing a subscribed feed. In some implementations, normalization removes punctuations in labels, removes common words (e.g., "a," "the") in labels, and recasts labels to lower case letters. For example, a label "The Sam's Place" is normalized into "sams place." Normalization can further include escaping a user label to an alphanumerical format (e.g., "baseball & soccer" to "baseball and soccer"), or encoding a user label in ASCII code or Unicode. In some implementations, a candidate topic represents more than one label. Labels that are represented by a same candidate topic are homogeneous labels. For example, labels "Sports," "sports," and "SPORTS" are homogeneous labels. Like labels, names of candidate feeds can also be normalized in a similar manner.

In some implementations, candidate topics are generated using user profile data. A user profile is a collection of information about a user. The information can include personal information, for example, a user name, place of work, school attended, user biography, and links to favorite resources. The user profile can also include the user's search history. The user's search history can include a query log that stores queries the user entered, as well as search results, which are references to resources (e.g., Web pages) identified in response to the queries. In some implementations, a user's search history includes Web pages that the user has visited after entering a query and receiving a search result.

The system generates 104 a candidate topic-candidate feed mapping from the topic data. The mapping can contain candidate topic-candidate feed pairs. A candidate topic-candidate feed pair is an association between a candidate topic and candidate feed. A candidate topic and a candidate feed can form a pair if at least one user uses a label that corresponds to the candidate topic to label the candidate feed. For example, a user can have a label "Sports," under which the user has two subscribed feeds "ESPN—MLB Baseball" and "ESPNsoccernet." The user thus has two candidate topic-candidate feed pairs in the mapping, "'sports' implies 'espnmlbbaseball'" and "'sports' implies 'espnsoccernet.'" The mappings, after further processing, can be a basis for association rules relating topics and feeds. The mapping can include a large collection of candidate topic-candidate feed pairs for the collection of users. The mapping of candidate topic-candidate feed pairs can be collapsed to include only unique candidate topic-candidate feed pairs. In a collapsed mapping, each unique candidate topic-candidate feed pair can be associated with a user count, which measures how many users give the same homogeneous label to the same feed.

The system generates 106 topic-feed association rules. An association rule is a relationship between two related items. An association rule can be in the form of "A→B or "A implies B." A topic-feed association rule identifies a rule of implication between a particular topic T and a particular feed F (e.g., "topic T implies feed F"). In a topic-feed association rule, a topic can imply one feed. Multiple topic-feed association rules can associate a same topic with different feeds. Additionally, or alternatively, the association rules can be generated in the form of "feed implies topic" association rules.

Each feed can imply many topics. Note that the relationships "topic implies feed" and "feed implies topic" can be different. That a topic T implies a feed F does not necessarily mean F implies T.

A "shopping cart" example can be used to illustrate an association rule. A person in a supermarket puts several items into a shopping cart. Assume the items are milk, peanut butter, and jelly. The owner of the supermarket has collected many receipts and can go through them to analyze what customers buy. The owner notices that most customers who buy peanut butter also buy jelly. The owner decides peanut butter and jelly are related. Therefore, the owner places peanut butter and jelly close to each other on the shelf. The owner also notices that while many people who buy peanut butter also buy milk, almost everybody who enters the store buys milk. The owner thus can conclude that buying peanut butter does not make a person any more likely to buy milk, and decides that peanut butter and milk are not related items. In this example, an association rule is "peanut butter implies jelly." An association rule can also be "jelly implies peanut butter." However, no peanut butter implies milk or jelly implies milk rules are established. Similarly, if a large percentage of users who subscribe to a feed (e.g., "NFL News Update") give the feed a particular label (e.g., "Sports News"), the feed may imply the label. However, the reverse may not be true (e.g., "Sports News" may not always imply "NFL News Update").

From the candidate topic-candidate feed mapping, the system generates association rules between topics and feeds in the form of "topic T implies feed F." Generating association rules from the mapping includes filtering the topic-feed mapping to exclude topic-feed pairs that do not satisfy one or more thresholds. The association rules are then generated from the topic-feed pairs that remain. The system can use the topic-feed association rules to classifying feeds into hierarchical categories and make feed recommendations. More details on generating association rules will be described below with respect to FIG. 2.

The system stores 108 association rules between topics and feeds. For example, the association rules can be stored on a storage medium, e.g., in computer memory or on a disk, and updated as new topics (e.g., user labels) and new feeds enter the system. The actual storing and updating of association rules on a storage device can be implemented according to various techniques. In some implementations, topic-feed association rules are generated "on the fly" in memory whenever association rules are needed. This implementation can have the benefit of having up-to-date information between topics and feeds based on recent feeds and labels for the collection of users. In some other implementations, topic-feed association rules are stored on a mass storage device, e.g., a database on a disk, or a disk array. To keep the rules current, the association rules stored on the storage device are updated periodically, using an intermediate rule table. A time between updates can vary (e.g., every hour, day, week, or months) based on a balance between the need for the most up-to-date information and the need to conserve computing resources.

Figure 2:
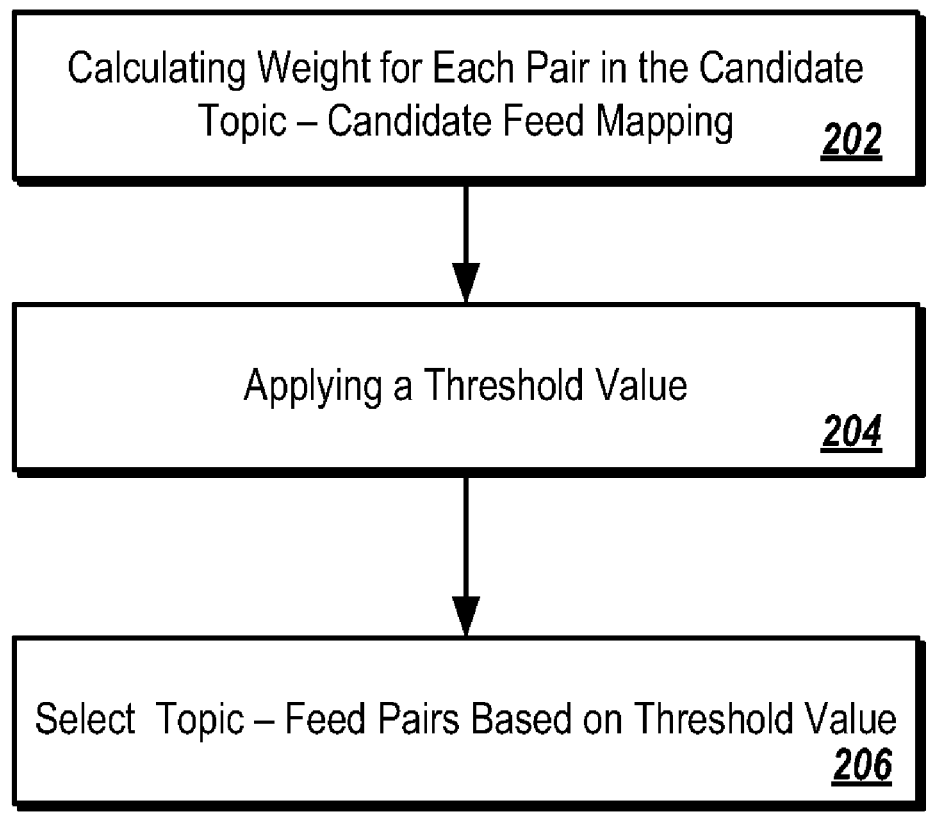
FIG. 2 is a flowchart illustrating an example method for generating a mapping between topics and feeds.

FIG. 2 is a flowchart illustrating an example method 200 for generating a mapping between topics and feeds. For convenience, the method 200 is described with respect to a system that performs the method 200. In some implementations, the method 200 corresponds with generating topic-feed association rules 106 in FIG. 1.

The system calculates 202 a weight of each of the candidate topic-candidate feed pairs. The weight is a value assigned to a particular candidate topic-candidate feed pair that measures how strongly the candidate feed is associated with the candidate topic. In some implementations, the candidate feed is strongly associated with the candidate topic when many users use homogeneous labels of the candidate topic to label the candidate feed. The weight can be calculated in different ways in various implementations.

In some implementations, the system calculates the weight of a candidate topic-candidate feed pair based on a number of users (e.g., a user count) who use homogeneous labels of the candidate topic to label the candidate feed. For example, the users who use homogeneous labels "Sports," "sports", and "SPORTS" to label "MLB Baseball" are counted together for candidate topic-candidate pair "sports implies mlb baseball." In some other implementations, in addition to calculating the number of users who use homogeneous labels of the candidate topic to label the candidate feed, the system further normalizes the weight to a value between zero and one. The normalization can be achieved, for example, by dividing all weights by the highest weight value in the mapping.

In some other implementations, calculating the weight further includes multiplying the number of users by a confidence factor. A confidence factor is a number or a set of numbers that can be used to adjust the user count. The confidence factor can have a value of "1" by default. The confidence factor for a candidate topic-candidate feed pair can be a value other than one when there are reasons to give more or less weight to the candidate topic-candidate feed pair. One example reason to give more weight to the candidate topic-candidate feed pair is that, historically, the candidate topic has been closely associated with the candidate feed. Historical data can be acquired, for example, from statistics on previous association rules acquired during each periodic update.

In some implementations, the weight of a particular candidate feed and a candidate topic pair is calculated according to the following steps:

First, the system calculates a popularity factor. The popularity factor can be calculated by the following formula:

$$n = \text{Max}(P_t \cdot P_e, k) \quad (1)$$

Where n is the popularity factor; $P_t$ is a popularity of the candidate topic, (i.e., the number of times that any feed has been labeled by a homogeneous label represented by the candidate topic); $P_e$ is popularity of the candidate feed, (i.e., the number of users that subscribe to the candidate feed); k is the number of times a homogeneous label under the candidate topic is applied to the candidate feed. The values of $P_t$, $P_e$, and k can be calculated from the topic data.

The system then calculates a relevance weight $W_1$, for example, according to the following formula:

$$W_1 = \frac{\binom{n}{k} \cdot p_t^k \cdot (1-p_t)^{n-k} \cdot p_r}{\binom{n}{k} \cdot p_t^k \cdot (1-p_t)^{n-k} \cdot p_r + \binom{n}{k} \cdot p_s^k \cdot (1-p_s)^{n-k}} \quad (2)$$

Where $W_1$ is the relevance weight; n and k are as defined in formula (1); and $P_t$ is a constant that controls the confidence of positive matches. For example, $P_t$ can have a value 0.8, meaning that in at least 80% of the matched pairs the candidate feed indeed belong to the candidate topic. $P_s$ is a constant that controls the confidence of negative matches. For example, $P_s$ can have a value 0.6, meaning that in at least 60% of the pairs that are considered not a match, the candidate feed indeed does not belong to the candidate topic. $P_r$ is an estimated ratio between feeds that actually belong to the candidate topic and feeds that do not belong to the candidate topic. In cases where a large corpus of feeds exists, $P_r$ can be a constant, for example, with a value of 0.001.

Finally, the system computes the weight of a candidate feed and a candidate topic pair using the following formula:

$$W = C_1 W_1 + C_2 \frac{k}{k + C_3} \quad (3)$$

Where W is the weight of a candidate feed and a candidate topic pair and W1 is a relevance weight calculated from formula (2). k is defined in formula (1). C1, C2, and C3 are constants that can be adjusted to tune the formula. C1 and C2 are values between 0 and 1. C3 is a positive number. Example values of C1, C2, and C3 are 0.9, 0.1, and 100, respectively.

A threshold value can be applied in selecting candidate feed-candidate topic pairs that have sufficient weight. The threshold value can represent the amount of confidence that is needed for a candidate feed-candidate topic pair to be selected as an association rule. The higher the threshold value, the fewer the candidate topic-candidate feed pairs are selected. The threshold can have a value between zero and one. The candidate feed-candidate topic pairs in the mapping whose weights are below the threshold value are discarded.

In some implementations, the weight of a candidate topic-candidate feed pair is calculated separately for each geographical location. Calculating weights according to geographical locations can provide finer granularity in measuring the strength of an association between a candidate feed and a candidate topic. For example, users in New York area can associate more feeds that are related to Yankees or Mets to a candidate topic "baseball" while users in the San Francisco Bay Area can associate more feeds that are related to Giants or Oakland Athletics ("The A's") to the same candidate topic. Geographically distinct weights can be used in determining whether a geographical region based interest bias exists. Geographically distinct weights can further be used in adjusting feed recommendations based on the identified interest biases. Feed recommendation will be described in detail below. A user's geographical location can be determined using various techniques. For example, a user's geographical location can be determined by the registration profile of the user, which includes a location explicitly entered by the user. A user' geographical location can also be determined by an IP address of the user's computer. Geo-location software can be used to map the IP address to a geographic location.

The system applies 204 the threshold value to exclude some candidate topic-candidate feed pairs. The threshold can represent a level of confidence that in the candidate topic-candidate feed pair, the candidate topic implies the candidate feed. The threshold value can be used to filter out abnormalities and other statistically insignificant pairs based on the association strength of the candidate topic-candidate feed pairs (e.g., a user mislabels a feed). The choice of threshold value can be determined by how the weight of a candidate topic-candidate feed pair is calculated. In some implementations, the threshold value is a positive integer n, denoting the top n most heavily weighted candidate topic-candidate feed pairs for a given candidate topic. In some implementations where formula (3) is used, a threshold value t between zero and one can be used, where a candidate topic-candidate pair having a weight less than t is excluded. In the above examples, the threshold values n and t can be adjusted based on empirical data, and can be tuned. Tuning can be used to control the number of candidate topic-candidate feed pairs that are filtered out. For example, the value n can be any value greater than zero. The value t can be a number between 0 and 1 (for example, 0.6, 0.7, and 0.8).

The system selects 206 one or more topic-feed pairs from the candidate topic-candidate feed pairs based on the threshold value and the weights. Selecting particular topic-feed pairs can include selecting the candidate topic-candidate feed pairs whose weights are at or above the threshold value. Selecting the topic-candidate feed pairs can also include discarding some candidate topics and all associating candidate feeds if the total weight for all candidate feeds for the candidate topic is statistically insignificant. The selected topic-feed pairs are used as the association rules between topics and feeds. In some implementations, the candidate topic-candidate feed pairs that are not selected are retained as historical data for use in calculating the confidence factor to increase or decrease the weight of candidate topic-candidate feed pairs in a next iteration (e.g., an update of the association rules) for calculating confidence factor for a candidate topic-candidate feed pair.

In some implementations, applying the threshold value and selecting candidate pairs are performed sequentially. However, in other implementations, the system applies multiple thresholds or filtering mechanisms. For example, for each candidate topic, the candidate feeds with top n user counts are preserved, while all the rest are discarded. After selecting some candidate topic-candidate feed pairs as topic-feed pairs, the selected topic-feed pairs can be reversed to create a feed-topic mapping. The weight of a feed-topic pair can be calculated by applying a conditional probability model, or other probability models.

Topic-feed pairs can be grouped either by topic or by feed. In the example above, the mapping is grouped by topics. That is, each topic can have one or more feeds associated with the topic. In other implementations, a reversed topic-feed mapping is created. The reversed topic-feed mapping is a topic-feed mapping grouped by feeds. That is, each feed can have one or more topics associated with the feed. Regardless of whether the topic-feed pairs are grouped by topic or by feed, a given topic can be associated with multiple feeds, and a given feed can be associated with multiple topics.

However, reversing a candidate topic-candidate feed pair into a candidate feed-candidate topic can require recalculating the weights of the pairs and reapplying the thresholds, because the relationship between a topic and a feed is directional. A topic T can strongly imply a feed F, but the same feed F may only weakly imply a topic T. Whether a reversal must be performed can depend on the availability and quality of the data. For example, if, in the topic data gathering process, users having a certain candidate topic T can be counted with more accuracy than users who subscribe to a certain feed F, calculating the probability that T implies F (alternatively noted as T→F, or P(F|T), which means the probability of F, given T) can provide better (i.e., more accurate) results than calculating the probability that F implies T. Therefore, it can be optimal to calculate weights based on candidate feed-candidate topic pairs and reverse the result to obtain weights based on candidate topic-candidate feed pairs.

Figure 3:
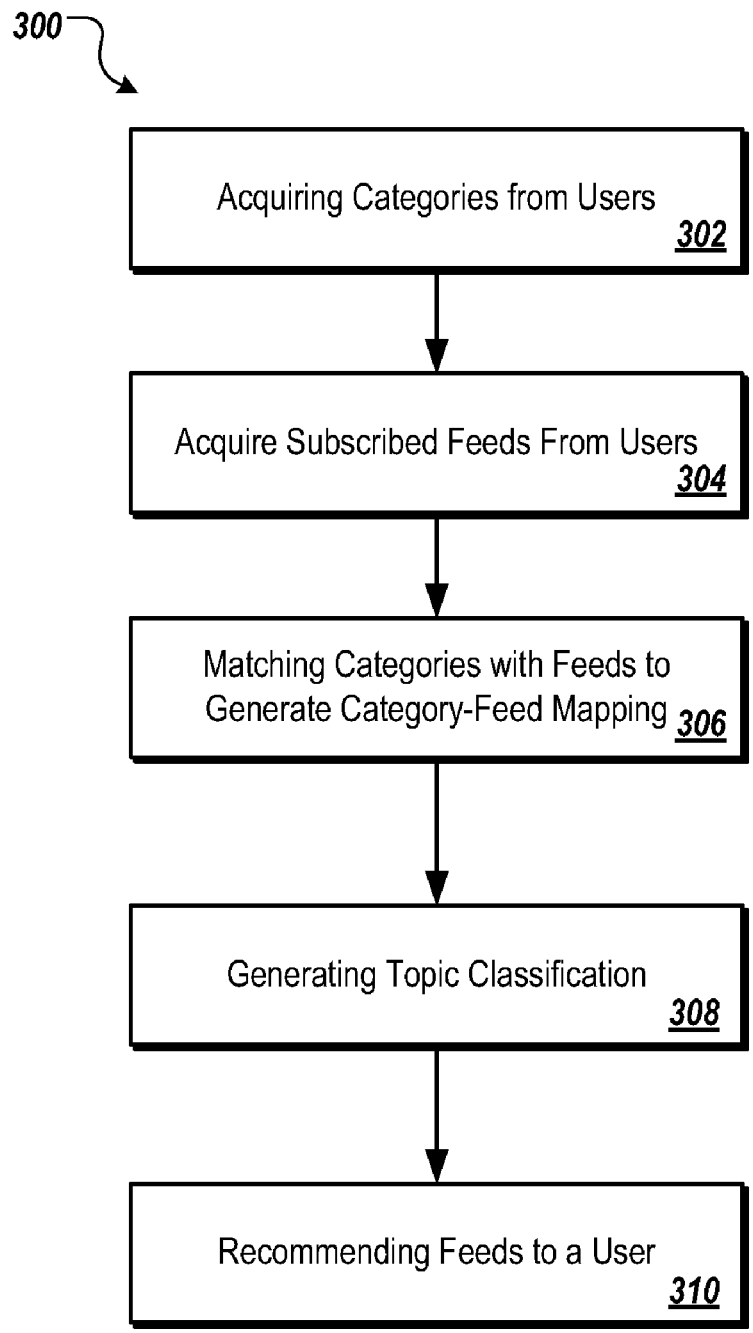
FIG. 3 is a flowchart illustrating an example method for recommending feeds to a user.

FIG. 3 is a flowchart illustrating an example method 300 for recommending feeds to a user. For convenience, the method 300 is described with respect to a system that performs the method 300. The system acquires 302 user categories from a collection of users. A user category is a classification of a user. A user category can have a hierarchical structure, such as "top/sports/baseball/major-league." A user can be classified into many user categories.

In some implementations, a user's user category is derived from the user's search history. For example, the user's query logs can be analyzed in order to identify the user's interests. The user can be classified into one or more user categories based on these interests.

In some implementations, a user's categories are ODP (Open Directory Project) categories of the pages a user visited after submitting a query. The ODP is a human-edited Web directory constructed and maintained by a community of editors. The ODP contains multiple of hierarchical categories (e.g., categories with different levels of specificity). For example, an ODP category can be "top/sports/baseball/history/major-league." Web pages can be classified into the hierarchical category in the ODP by the editors. The system can determine the ODP categories of a Web page by looking up the page in the ODP. Looking up a page in the ODP can include, for example, crawling the ODP. The ODP categories of a Web page that a user visits can be recorded as one of the user's categories. For example, if a user has visited a specific Web page titled "California Baseball Almanac," the system can perform a look up in the ODP and determine that the specific page belongs to a category "/top/sports/baseball/history/major-league." The system can classify the user under this category if the user was not already so classified. A system can manage a user's categories by, for example, setting a limit on to how many categories a user can belong, removing a user from a category if the user has not visited any Web page belonging to that category for a certain period of time, or modifying the user's category when the category's hierarchical structure changes in the ODP.

The system acquires 304 feeds. In some implementations, acquiring feeds includes obtaining user subscribed feeds. Acquiring user subscribed feeds can include parsing user topic data to identify feeds using techniques described above with respect to FIG. 1.

The system matches 306 categories with the feeds selected from topic-feed association rules in order to create a category-feed mapping. The matching is calculated based on a probability model. In some implementations, the mapping is acquired from the ODP. For example, when a subscribed feed and its category are acquired from an ODP directory, the relationship between category and feed is already known, because feeds in ODP have editor-assigned categories. In some implementations, more than one category can match a same feed. A feed provider can submit a feed that is classified into more than one category in the ODP. For example, a feed "New York Yankees News Feeds" can be in an ODP category "Top/Sports/Baseball/Major League/Teams/New York Yankees/News and Media." The same feed can be in another ODP category "Top/Regional/North America/United States/New York/Recreation and Sports/Baseball." In these implementations, the category-feed mapping can map the feed with each of its two ODP categories.

In some implementations, matching the categories with the feeds is based on applying a probability model to user categories and user subscribed feeds. The details for some of these example implementations are described below with respect to FIG. 4.

The system generates 308 a topic classification based on the category-feed mapping and the topic-feed association rules. In the topic classification, topics are classified into categories. In some implementations, the feeds act as a link between the category-feed mapping and the topic-feed association rules. In a topic classification, each topic can be classified into one or more categories.

The system recommends 310 feeds to a user. The feed recommendations can be provided to the user, for example, on the user's browser. The feed recommendations are based on the category-feed mapping and the topic classification. Recommending a feed can include selecting a feed based on a calculated prediction of the user's interests. In some implementations, the user's interests can be predicted from the user's categories, the user's topics, and a combination of the user's categories and topics. A probability of interest can be calculated for feeds based on comparing the feed's category with the user's interest. Detailed process of making user recommendation is described below with respect to FIG. 5. For example, recommending feeds to a user can include displaying links to one or more feeds in a "recommended feeds" area on a customizable Web page provided to the user.

Figure 4:
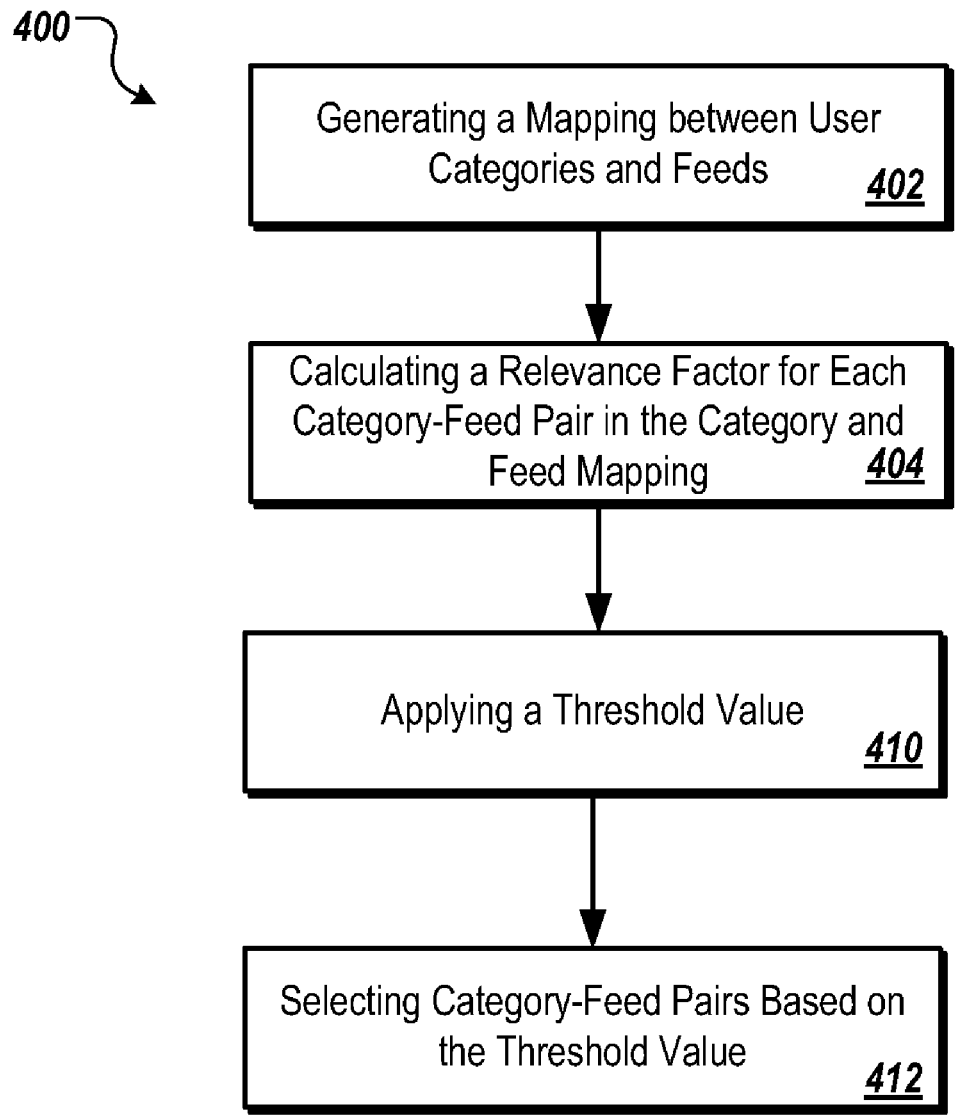
FIG. 4 is a flowchart illustrating an example method for generating a category-feed mapping.

FIG. 4 is a flowchart illustrating an example method 400 for generating a category-feed mapping. For convenience, the method 400 is described with respect to a system that performs the method 400. The method 400 can correspond to the matching 306 of FIG. 3 in the process 300 of recommending a feed to a user.

The system generates 402 a mapping between user categories and subscribed feeds by pairing the categories and the feeds. If a user has categories C1, C2, and C3, and the user has subscribed to feeds F1, F2, and F3, a cross product is created to generate category-feed pairs C1-F1, C1-F2, C1-F3, C2-F1, C2-F2, C2-F3, C3-F1, C3-F2, and C3-F3. The category-feed pairs can be created for a large number of users.

The system calculates 404 a relevance factor for each category-feed pair. Calculating a relevance factor can include applying a one or more probability models to analyze the probability that a feed is associated with a category. For example, a Bayesian model can be used to analyze the probability that a feed is associated with a category. In some implementations, the system calculates a weight of an association between a user category and a feed as:

$$P(F|C)=P(C \& F)/P(C) \qquad (1)$$

where C stands for category, and F stands for feed. $P(F|C)$ is the calculated weight, which is measured by the probability that feed F belongs to category C. $P(C \& F)$ is the probability that a user belongs to a category C while the user has subscribed to feed F. $P(C)$ can be the probability that a user has a user category C. $P(C \& F)$ can be calculated by calculating the frequency that a particular C-F pair appears in all category-feed pairs in the cross product. $P(C)$ can be calculated by counting the frequency that category C appears in all categories.

For example, a user is classified into a category C based on the user's profile. To measure the probability that feed F belongs to category C, the system divides the frequency with which users who belong to category C also subscribe to feed F by the frequency that category C appears in all categories. If there are 1,000 C-F pairs among 1,000,000 pairs of categories and feeds in the cross product, and if category C appears 5,000 times in the cross-product, the probability the F belongs to C is 0.2 ((1,000/1,000,000)/(5,000/1,000,000)=0.2).

In some other implementations, other probability models are used. For example, a method similar to the method calculating a topic-feed mapping, as described above with reference to FIG. 2, can be used. Normalization can also be applied to category-feed mapping. A probability value can be assigned to each category-feed pair in a category-feed mapping as a weight. In normalized category-feed mapping, each category-feed pair can have a relevance factor between zero and one. Category-feed mapping can be grouped by categories or grouped by feeds.

The system applies 410 a threshold value to filter the category-feed mapping that has been assigned relevance factors.

The category-feed mapping can be a large collection of category-feed pairs derived from a large number of users. Some category-feed pairs can be statistical aberrations caused by various factors. For example, a human editor of the ODP may misclassify a feed to an unrelated category. Similarly, a user may mistakenly subscribe a feed that does not match the user's general profile, including the user's category. A threshold value can be a control mechanism to filter out such category-feed pairs.

In a category-feed mapping where each category-feed pair has a relevance factor normalized into a value between zero and one, the threshold value can be any value between zero and one. The threshold value can be configured to give a system various characteristics. For example, a high threshold value can cause fewer category-feed pairs to be selected, leading to more precise, but less comprehensive mapping. A low threshold value can cause more category-feed pairs to be selected, leading to less precise, but more comprehensive mapping.

The system selects 412 particular category-feed pairs based on the threshold value. In particular, category-feed pairs having a relevance factor below the threshold value can be discarded. What remains of the category-feed mapping can be stored as an input for a process that recommends feeds to users. The category-feed mapping can be grouped by categories or by feeds.

Figure 5:
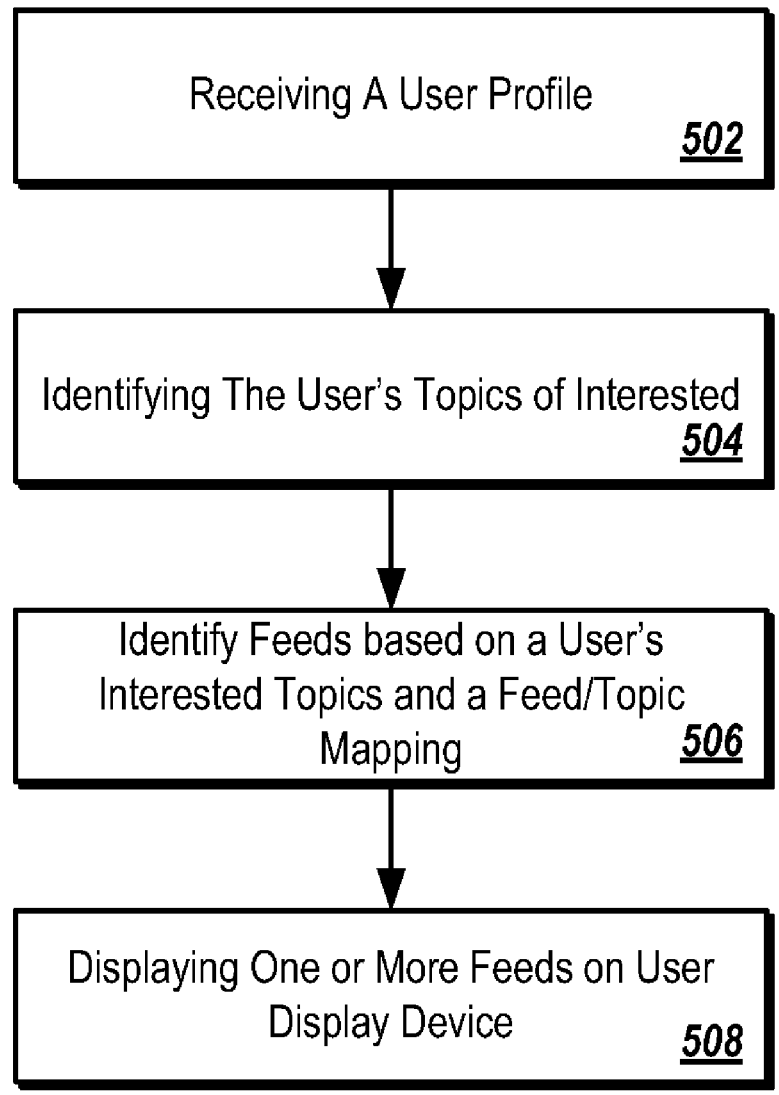
FIG. 5 is a flowchart illustrating an example method for recommending feeds to a user based on the user's specific data.

FIG. 5 is a flowchart illustrating an example method 500 for recommending feeds to a user based on the user's specific data. For convenience, the method 500 is described with respect to a system (e.g., a recommendation system) that performs the method 500. The method 500 in FIG. 5 can correspond to the recommending feeds 310 of FIG. 3.

The system receives 502 a user profile. A part of the user profile can include information entered by the user, for example, one or more user interests, the user's name, geographical location, age, and gender. Another part of the user profile can include information generated from an external source (e.g., a Web service provider), for example, one or more user categories or query logs. Query logs can contain the user's search history, including search queries and search results viewed. User profiles can be stored on a server, and retrieved during the recommendation process.

The system identifies 504 the user's topics of interest. In some implementations, the user's topics of interest are the normalized labels the user created for the user's subscribed feeds. The user's topics of interest can also be located in the topic classification, when a category of the user is also a category of a particular topic in the topic classification.

In some implementations, recommending feeds to a user is based on a user's categories and a topic classification. If the user belongs to one or more user categories but has not selected a label, a topic classification can be used to derive the possible topics in which the user has interest. The user profile can contain the user's categories. The user's topics of interest can be identified by looking up the topics that match the user's categories in the topic classification. The user's feeds of interest can be predicted by the topics based on the topic-feed association rules.

A new user can have no categories or topics. When neither category information nor topic information is available, the feeds that are most popular in the topic-feed association rules, measured by weight, can be recommended to the user. In addition, a user can have user categories but no topics (e.g., a user who performed search but never gave a label to a feed), or have topics but no categories (e.g., a user who never performed a search but who customized a page is by subscribing to a feed). In these cases, one of the category-feed mapping or the topic-feed association rules can be used to determine in which feed the user may be interested. If a user has both categories and topics, a cross mapping between topic-feed association rule and category-feed mapping can be used to make the determination. If a feed having a high probability of interest value can be located in both a topic-feed association rule and a category-feed mapping, the user is likely to be highly interested in the feed.

The system identifies 506 recommendable feeds based on the user's topics of interest and one or more topic-feed association rules. The recommendable feeds can be determined by applying the topic-feed association rules to the user's topics of interest. For example, if the user has a topic of interest "baseball," the system can identify the recommendable feeds by looking up the topic-feed association rules under the topic "baseball." In some implementations, the recommendable feeds of a user are sorted by an interest level. The interest level can be approximated by the weights of the topic-feed pairs in the topic-feed association rules. For example, a particular user has a topic of interest "baseball." In the topic-feed association rules, a topic-feed pair "'baseball,' 'The Baseball Almanac'" weighs the most among pairs under topic "baseball." Therefore, the system predicts that the particular user has a high interest level in feed "The Baseball Almanac" and recommends the feed to the user.

The system displays 508 one or more recommendable feeds identified based on the user's topics of interest and a topic-feed association rules, for example, in a recommendation section in a browser window on a display device. The recommended feeds can be displayed in a random order, or ordered in accordance with the user's estimated level of interest in the feed's relevance.

In some implementations, user specific information in the user profile is used in the recommendation process. The user specific information in the user profile can contain the user's geographical location. The geographical location can be stored implicitly or explicitly on a storage device. An implicit geographical location can be the IP address of a computer on which the user is interacting with the recommendation system. Further, an implicit geographical location can be the IP address of a computer from which the user last logged on to the Web service provider to view or manage one or more feeds. The geographical location is implicit because IP addresses can be translated to actual geographical addresses by readily available geo-location software.

An explicit geographical location can be a location that has been entered by a user in the user's profile (e.g., in a registration process). Alternatively, a user can enter a location when the user updates their user profile. Geographical location can be stored in the form of a text string or a code that represents a country, state, county, or city. Alternatively, geographical location can be stored in the form of postal code (e.g., zip code in the United States).

Geographical location can be used in the recommendation process when a category-feed mapping, a collection of topic-feed association rules, or a topic classification contains weights that are specific to geographic locations. In some implementations, only feeds that are specific to a geographical region are considered for recommendation. A feed can be specific to a geographical region, for example, if the feed is associated with a category directed to a particular geographic region, e.g., "top/regional/north-america/united states/new-york/recreation-and-sports/baseball." Thus, a feed can be classified under a geographic region based category when the feed provider gives the feed such a category in ODP.

In some other implementations, geographical region is not a determinative limit to feed recommendation. Instead, a feed that matches a user's geographical region is given a higher priority. The higher priority can put a feed higher in a recommendation list. The higher priority can be implemented by giving a probability of interest a multiplier, e.g., a weight, that has a value greater than or equal to one. The multiplier can be adjusted based on the precision requirement of a match. Alternatively, the system can demote feeds in the recommendation list that do not belong to the geographic region (e.g., weight between 0 and 1). For example, if a user is located in San Francisco, the user's regional match multiplier to a feed that is "top/regional/north-america/united-states/new-york/recreation-and-sports/baseball" can still be greater than one, because the user is in the United States. However, the multiplier in the above example is not greater than a multiplier of a feed that belongs to a category that is specific to San Francisco Bay Area.

Figure 6:
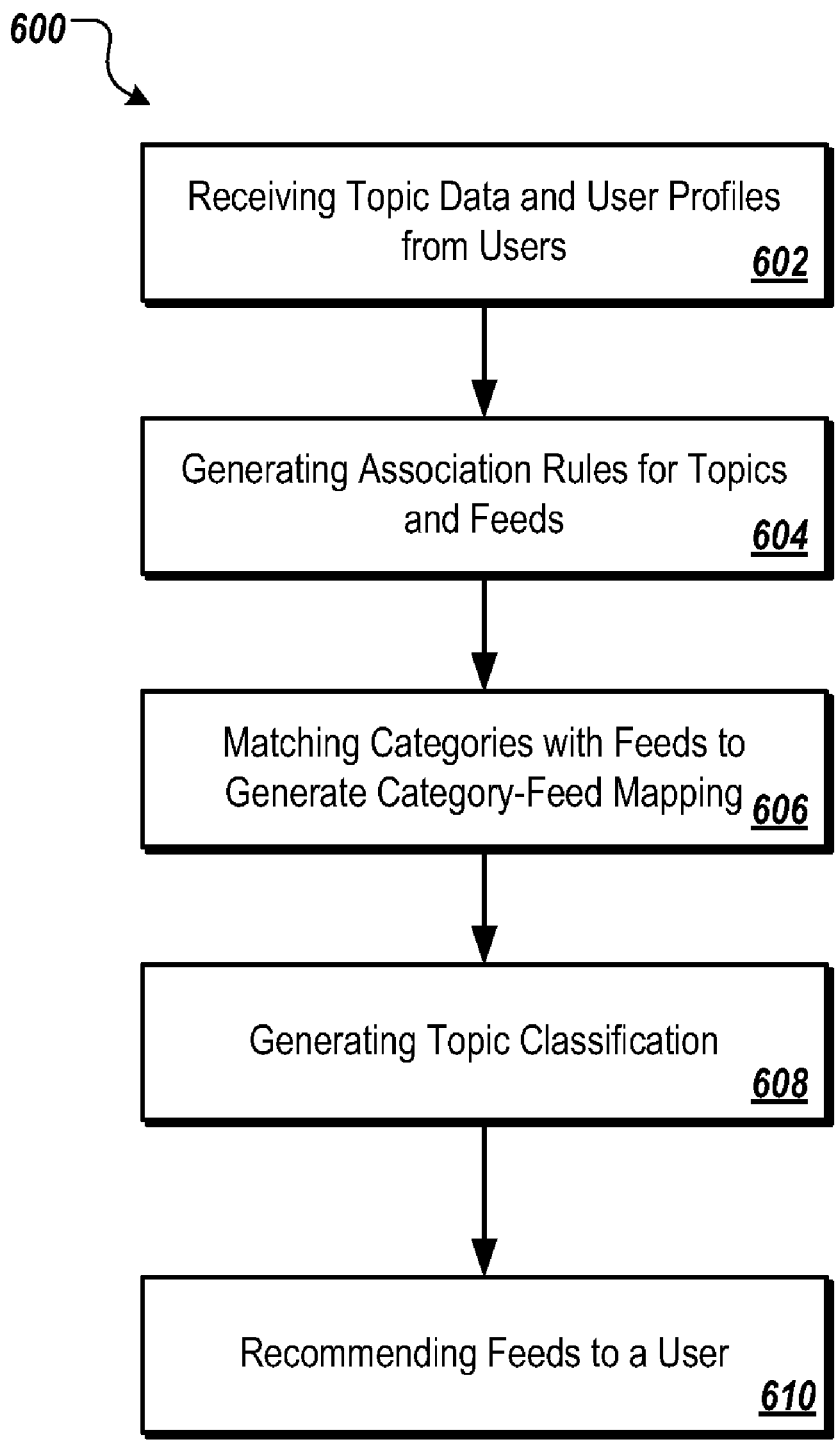
FIG. 6 is a flowchart illustrating another example method for recommending feeds to a user.

FIG. 6 is a flowchart illustrating another example method 600 for recommending feeds to a user. In some implementation, the method 310 in FIG. 5 can be a part of step 610 in method 600. For convenience, the method 600 is described with respect to a system (e.g., a recommendation system) that performs the method 600.

The system receives 602 topic data from a population of users. Receiving topic data can include receiving a history of user labels (e.g., all the labels the users have created, including the ones that the users have since deleted) and user subscribed feeds (e.g., all the feeds to which the users have subscribed, including the ones that the users have since unsubscribed). Alternatively, receiving topic data can include receiving a snapshot of user labels (e.g., the labels that the users currently have) and subscribed feeds (e.g., the feeds to which the users currently subscribe). Receiving topic data can further include gathering candidate topics from user profiles. Receiving topic data can also include aggregating the labels and subscribed feeds.

The system generates 604 association rules for topics and feeds in the topic data. Generating association rules can include retrieving candidate topics and candidate feeds from the topic data. Candidate topics and candidate feeds can be retrieved, for example, from the aggregated user labels. User labels and subscribed feeds can be normalized. The system can create a candidate topic-candidate feed mapping that contains candidate topic-candidate feed pairs. The system can calculate a weight for each candidate topic-candidate feed pair. Calculating a weight for each candidate topic-candidate feed pair can include counting the number of users who give a homogeneous label of the candidate topic to a subscribed feed that is the candidate feed.

In some implementations, the system applies a threshold and selects certain candidate topic-candidate feed pairs based on the threshold. In one implementation, candidate topic-candidate feed pairs are grouped by candidate topics. For each candidate topic, the n number of candidate feeds with top user counts are kept. The remaining candidate feeds are discarded.

The system matches 606 categories and feeds in order to create a category-feed mapping based on a probability model. In some implementations, matching categories and feeds 606 can employ the techniques described in process 306. The system generates 608 a topic classification. Categories and topics are matched to create a topic classification based on the filtered category-feed mapping and topic-feed association rules, as described above. In some implementations, matching categories and topics 608 can employ the techniques described in process 308. The topic classification can be stored on a storage device and can be periodically updated.

The system recommends 610 one or more feeds to a user on a display device based on the topic-feed association rules, the category-feed mapping, and the topic classification. Recommending feeds can also include determining a user's topics of interest based on the user's profile. A user's profile can contain the user's existing labels, subscribed feeds, and categories can be components of the user's profile. Determining a user's topics of interest can include identifying the user's user-created labels, identifying topics based on the user categories and topic classification.

Recommending feeds can also include determining a user's geographical location based on the user's profile, and identifying topics or feeds related to the geographical location. For example, topics can relate to a geographical location by specifying the location, such as "San Francisco Bay Area." A feed can relate to a geographical location based on the category in the category-feed mapping. A feed can also relate to a geographical location based on a number of users in that geographical location who subscribe to the feed.

Figure 7:
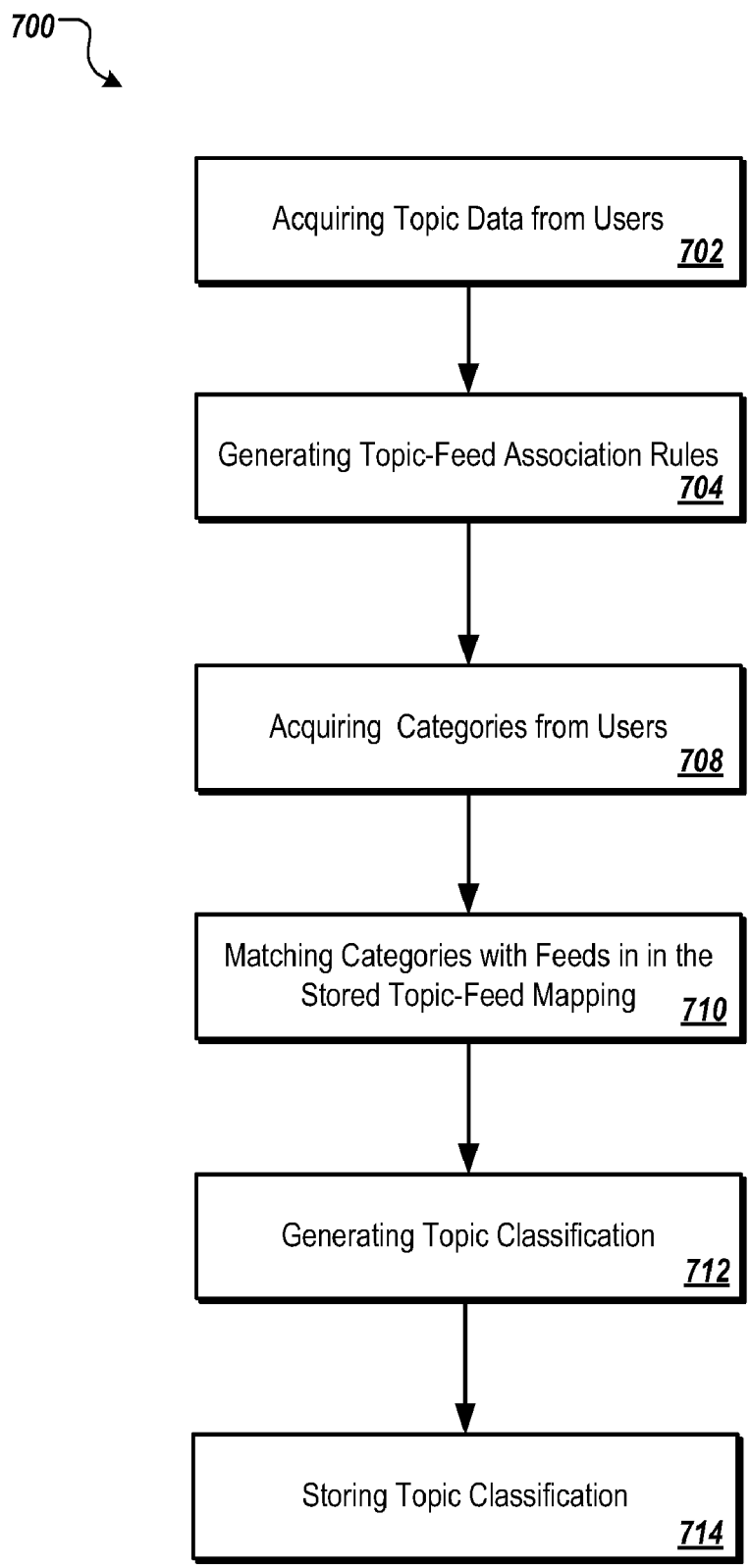
FIG. 7 is a flowchart illustrating an example method for generating a topic classification.

FIG. 7 is a flowchart illustrating an example method 700 for generating a topic classification. For convenience, the method 700 is described with respect to a system (e.g., a classification system) that performs the method 700.

The system acquires 702 topic data from a collection of users. The topic data can include candidate feeds and candidate topics. The system generates 704 topic-feed association rules. Generating topic-feed association rules can include selecting feeds from candidate feeds and selecting topics from candidate topics, based on a topic-feed threshold. In some implementations, generating topic-feed association rules can utilize the same techniques as described above with respect to FIG. 1. The system stores the generated topic-feed association rules on a storage device. The system acquires 708 user categories from a group of users, for example, by using techniques as described above with respect to FIG. 3. The group of users whose user categories are acquired can be different from the collection of users whose topic data are acquired.

The system matches 710 the user categories with the feeds in the stored topic-feed association rules. A category-feed mapping is generated. An example process for generating a category-feed mapping is described above in FIG. 3. The system generates 712 a topic classification based on the category-feed mapping and the topic-feed association rules. An example process for generating the topic classification is described above with respect to FIG. 3.

The system stores 714 the topic classification on a storage device. After creating the topic classification, one or more feeds can be recommended to a user. The recommendation can be based on the topic classifications and the user's profile.

FIG. 8 is a diagram 800 illustrating an example threshold to candidate feed-candidate topic mapping. The threshold can similarly be used in generating association rules, making a topic classification, and recommending feeds to a user. For example, a feed-topic pair can be selected if the pair has a weight that exceeds a threshold in order to form an association rule. Diagram 800 includes a table 801. Table 801 is a mapping between candidate feeds and candidate topics. Data in table 801 are collected from a collection of users.

In table 801, candidate feed-candidate topic pairs are stored in a table format. In a candidate feeds column 810, all feeds subscribed by the collection of users are listed. A same feed can be given different labels by different users. For example, candidate feed FTQN.com can be labeled "Baseball," "Sports," "As," "Giants," and "Yankees." These labels, after normalization, can be listed as candidate topics in a candidate topics column 820. An example candidate feed-candidate topic pair can be "FTQN.com—Baseball," etc. Each candidate feed-candidate topic pair can have a user count associated with the pair. For example, 50,000 users have given a feed FTQN.com a label "Baseball," while 60,000 users have given the feed FTQN.com a label "Sports." The user count for each feed-topic pair is stored in a user count column 830 in the table 801. In the above example, the pairs are grouped by candidate feeds 810. The pairs can alternatively be grouped by candidate topics in a way similar to grouping by candidate feeds. In this example, the user counts are used as weights of the pairs.

Thresholds 840, 850, and 860 are applied to candidate feeds and candidate topics. For example, threshold 840 can be set for candidate feeds FTQN.com. Threshold 840 can have a value of 4,000. Applying threshold 840 for feed FTQN.com, candidate feed-candidate topic pairs whose user count are below 4,000 are discarded. Similarly, threshold 850 can have a value of 2,700. Applying threshold 850, candidate feed-candidate topic pairs whose user count are below 2,700 are discarded. Similarly, threshold 860 can be applied to candidate feed-candidate topic pairs grouped under feed "DCT Sports Line Feed." Threshold values 4,000 and 2,700 can be applied universally across all feed groups. In an example, threshold 860 can have the value of 4,000 and 2,700, corresponding to the values of threshold 840 and 850. However, it is not necessary for thresholds for different candidate feeds to have a uniform value. Threshold 860 can have a value for 2,000, for example.

In the above example, a threshold value used in filtering is a raw number of user counts. In other implementations, the threshold value can be a normalized user count, a conditional probability value under the Bayesian formula (1), or another value. A threshold value can be applied uniformly, or applied specifically to each topic or feed. Furthermore, in some implementations, filtering is achieved by ranking, instead of by applying threshold value.

Figure 9:
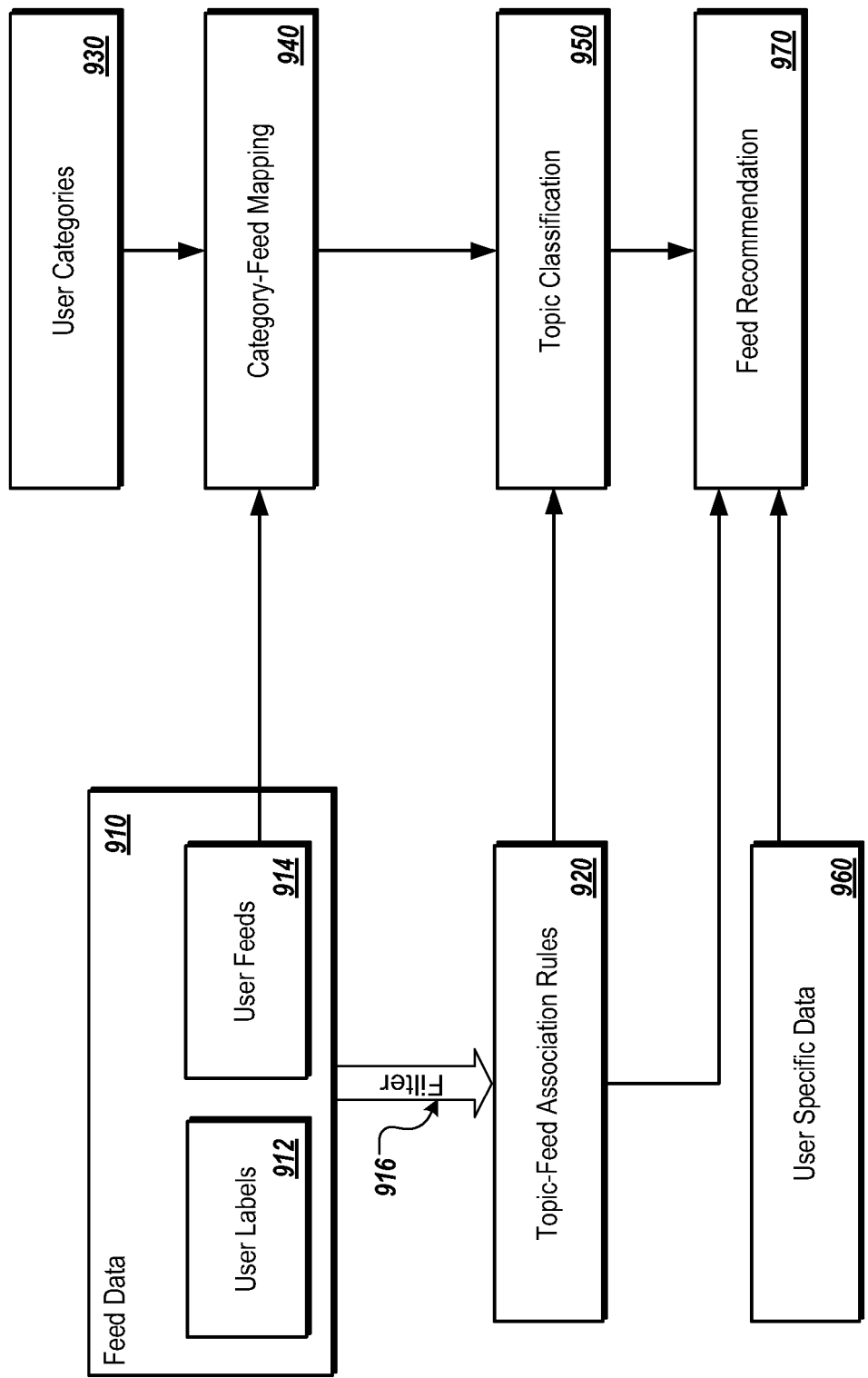
FIG. 9 is a schematic diagram illustrating example relationships between various components for recommending feeds to a user.

FIG. 9 is a schematic diagram 900 illustrating example relationships between various components for recommending feeds to a user. Box 910 represents feed data obtained from a collection of users. Feed data 910 can contain user labels and user subscribed feeds.

Arrow 916 is a filtering process that generates topic-feed association rules 920. The filtering process can including normalization of the user labels into candidate topics, mapping candidate topics with candidate feeds that contain candidate topic-candidate feed pairs, calculating weight of each candidate topic-candidate feed pair, and applying threshold to select one or more topic-feed pairs from the candidate topic-candidate feed pairs. Various methods for calculating weights and for applying thresholds are described above.

Box 920 represents the topic-feed association rules. In a topic-feed association rule, a topic implies a feed. Topic-feed association rules can be stored on a storage device. Topic-feed association rules can be updated periodically. Topic-feed association rules can be reversed to create feed-topic association rules. Feed-topic association rules can be applied to a process to create topic classification 950.

Box 930 represents user categories of a collection of users. User categories 930 can be collected from the collection of users independent of a process that collects topic data. User categories can be derived from a variety of sources. For example, a user's categories can be based on the categories of the Web pages the user visited. The categories of the Web pages can be found in the ODP.

Box 940 is a category-feed mapping. Category-feed mapping 940 can be generated based on an aggregation of users' subscribed feeds and users' categories. A system can create a cross product between a user's subscribed feeds and the user's categories. For example, if a user has m subscribed feeds and n categories, the user can have m×n category-feed pairs. The category-feed pairs for a group of users can be aggregated. A relevance factor can be calculated for each unique category-feed pair in the aggregation based on a probability model. The relevance factor can be based on, for example, a user count, a normalized user count, or a probability value.

Topic classification 950 is generated from topic-feed association rules 920 and category-feed mapping 940. Topic classification 950, as well as topic-feed association rules 920, can contain a geographical location specific weight. The geographical location specific weights can be used to refine feed recommendation 970.

Feed recommendation 970 can be one or more feeds that are displayed on a user display screen. Feed recommendation 970 can be feeds selected from a collection of content feeds. The selections can be based on topic classification 950, topic-feed association rules 920, and user specific data 960. User specific data 960 can contain a user's categories (in contrast to the collection of categories for a group of users 930), a user's geographical location, a user's subscribed feeds, and a user's existing labels.

Figure 10:
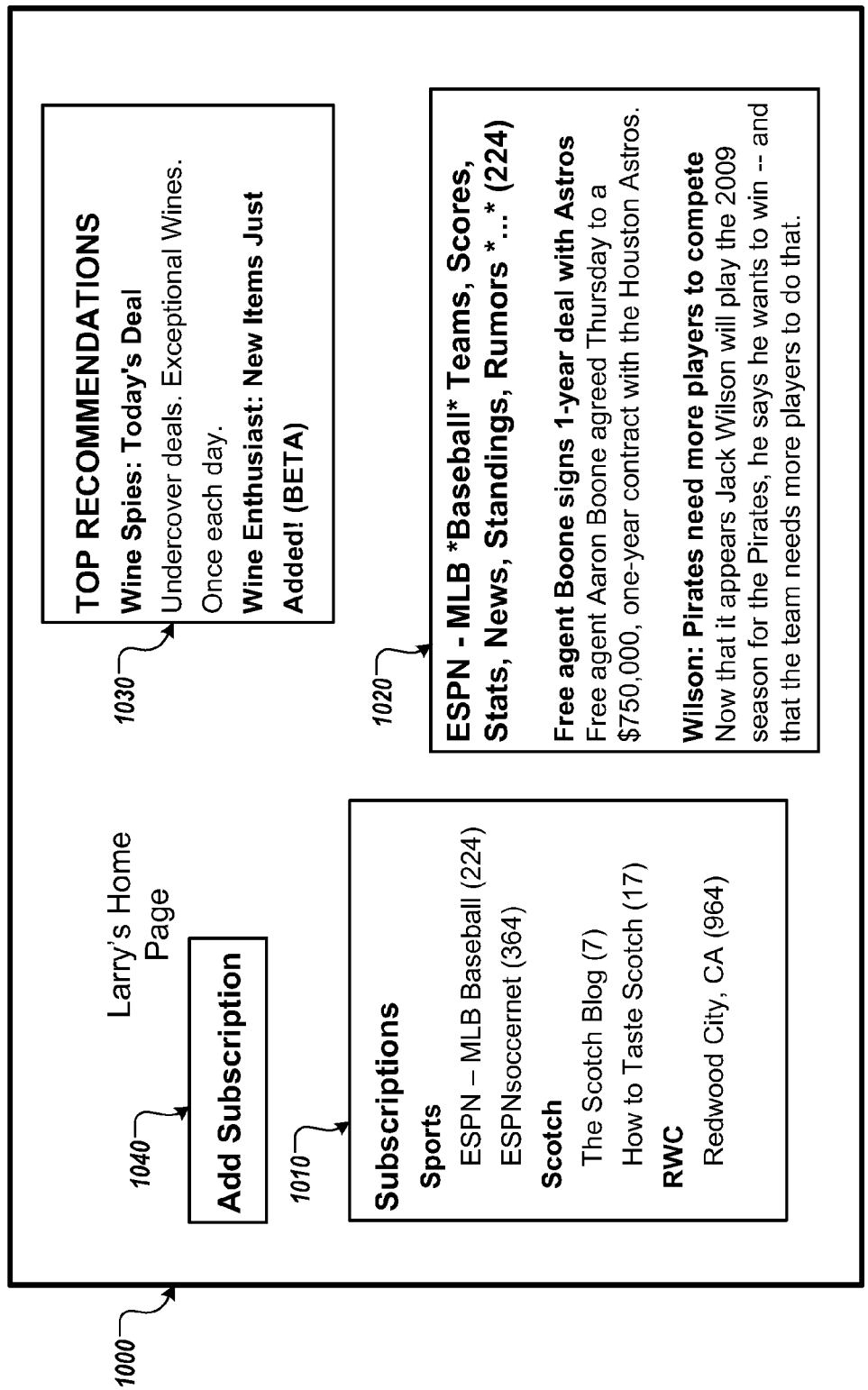
FIG. 10 is an example display of a user customizable Web page that contains feed recommendations.

FIG. 10 is an example display of a user customizable Web page 1000 that contains feed recommendations. User customizable page 1000 is a Web page provided by a Web service provider and displayed on a user's display device. Page 1000 can include a subscription section 1010, a main section 1020, and a recommendation section 1030.

Subscription section 1010 displays a user's subscribed feeds and corresponding labels. In this example, the feeds "ESPN—MLB Baseball" and "ESPNsoccernet" are under a label "Sports." The feeds "ESPN—MLB Baseball" and "ESPNsoccernet" can be candidate feeds. The label "Sports" can be normalized into a candidate category. A user can subscribe to a feed by clicking an "add subscription" button 1040. The information in subscription section 1010 can form topic data Main section 1020 can display one or more current feeds. For example, a user can click on a feed name "ESPN—MLB Baseball" to view that feed, or click on label "Sports" to view updates of all feeds under label "Sports." Recommendation section 1030 can display one or more feed recommendations provided, for example, as described above with respect to the user's interest.

Figure 11:
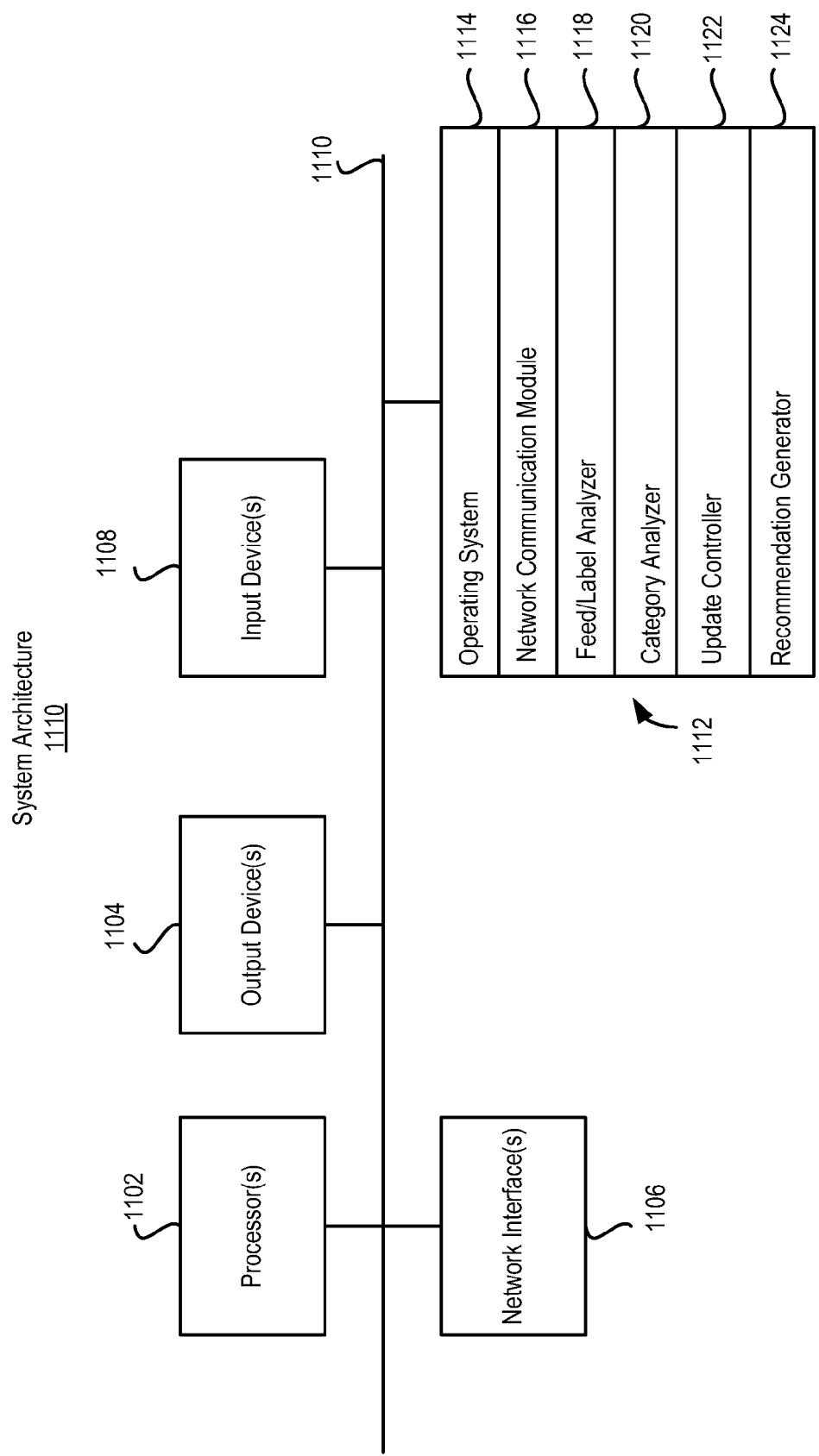
FIG. 11 is a block diagram of a system architecture for implementing the features and operations described in reference to FIGS. 1-10.

FIG. 11 is a block diagram of a system architecture 1100 for implementing the features and operations described in reference to FIGS. 1-10. Other architectures are possible, including architectures with more or fewer components. In some implementations, the architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable mediums 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to any medium that participates in providing instructions to a processor 1102 for execution, including without limitation, non-volatile media (e.g., optical or magnetic disks), volatile media (e.g., memory) and transmission media. Transmission media includes, without limitation, coaxial cables, copper wire and fiber optics.

The computer-readable medium 1112 further includes an operating system 1114 (e.g., Mac OS® server, Windows® NT server), a network communication module 1116, feed/label analyzer 1118, category analyzer 1120, update controller 1122, and recommendation generator 1124. Feed/label analyzer 1118 can be used to generate topic-feed association rules. Category analyzer 1120 can be used to generate topic classifications based on categories. Update controller can be used to schedule periodical updates of topic-feed association rules and topic classifications. Recommendation generator 1124 can be used to generate recommended feeds based on topic classifications, topic-feed association rules, and user specific data. The operating system 1114 can be multi-user, multiprocessing, multitasking, multithreading, real time, etc. The operating system 1114 performs basic tasks, including but not limited to: recognizing input from and providing output to the devices 1106, 1108; keeping track and managing files and directories on computer-readable mediums 1112 (e.g., memory or a storage device); controlling peripheral devices; and managing traffic on the one or more communication channels 1110. The network communications module 616 includes various components for establishing and maintaining network connections (e.g., software for implementing communication protocols, such as TCP/IP, HTTP, etc.).

The architecture 1100 is one example of a suitable architecture for hosting a browser application having audio controls. Other architectures are possible, which include more or fewer components. The architecture 1100 can be included in any device capable of hosting an application development program. The architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

In the illustrations and in the detailed descriptions, some steps occur before other steps in a sequence. This does not necessarily mean that a system must perform operations in the order in the sequence. For example, in some implementations, matching categories and feeds occurs subsequent to generating association rules for topics and feeds. In other implementations, matching categories and feeds occurs concurrently with or before generating association rules for topics and feeds.

What is claimed is:

1. A method performed by data processing apparatus, the method comprising:
  acquiring topic data from a plurality of users, the topic data including candidate feeds and candidate topics;
  generating a candidate topic-candidate feed mapping from the topic data, the candidate topic-candidate feed mapping includes candidate topic-candidate feed pairs;
  generating topic-feed association rules using the mapping, the topic-feed association rules identifying rules of implication between topics and feeds, wherein generating topic-feed association rules comprises:
    calculating a weight of each candidate topic-candidate feed pair;
    applying a threshold to the each candidate topic-candidate feed pair, the threshold representing a level of confidence that in the candidate topic-candidate feed pair, the candidate topic implies the candidate feed; and
    selecting topic-feed pairs from the candidate topic-candidate feed pairs using the threshold and the weight of the each candidate topic-candidate feed pair; and
  using the topic-feed association rules to recommend the feeds to a user.

2. The method of claim 1, where calculating the weight of the each candidate topic-candidate feed pair comprises calculating a number of users who use a homogeneous label of the candidate topic to label the candidate feed.

3. The method of claim 1, where calculating the weight of the each candidate topic-candidate feed pair includes applying a formula $$W = C_1 W_1 + C_2 \frac{k}{k + C_3}$$

where:
W is the weight;
W1 is a relevance weight; k is the number of times a homogeneous label under the candidate topic is applied to the candidate feed in the topic data; and
C1, C2, and C3 are constants, wherein C1 and C2 are values between 0 and 1, and C3 is a positive number.

4. The method of claim 3, wherein the relevance weight W1 is calculated using formula $$W_1 = \frac{\binom{n}{k} \cdot p_t^k \cdot (1 - p_t)^{n-k} \cdot p_r}{\binom{n}{k} \cdot p_t^k \cdot (1 - p_t)^{n-k} \cdot p_r + \binom{n}{k} \cdot p_s^k \cdot (1 - p_s)^{n-k}}$$

where:
n is a popularity factor;
Pt is a constant that controls a confidence of positive matches;
Ps is a constant that controls a confidence of negative matches; and
Pr is an estimate ratio.

5. The method of claim 4, wherein the popularity factor n is calculated using formula $$n = \text{Max}(P_l \cdot P_e, k)$$

where
Pl is a popularity of the candidate topic; and
Pe is popularity of the candidate feed.

6. The method of claim 1, where the candidate topics are extracted from user created labels.

7. The method of claim 1, wherein the topic data include user-defined relationship between candidate topics and candidate feeds.

8. A computer program product encoded on a computer storage medium, operable to cause data processing apparatus to perform operations comprising:
acquiring topic data from a plurality of users, the topic data including candidate feeds and candidate topics;
generating a candidate topic-candidate feed mapping from the topic data, the candidate topic-candidate feed mapping includes candidate topic-candidate feed pairs;
generating topic-feed association rules using the mapping, the topic-feed association rules identifying rules of implication between topics and feeds, wherein generating topic-feed association rules comprises:
calculating a weight of each candidate topic-candidate feed pair;
applying a threshold to the each candidate topic-candidate feed pair, the threshold representing a level of confidence that in the candidate topic-candidate feed pair, the candidate topic implies the candidate feed; and
selecting topic-feed pairs from the candidate topic-candidate feed pairs using the threshold and the weight of the each candidate topic-candidate feed pair; and
using the topic-feed association rules to recommend the feeds to a user.

9. The product of claim 8, where calculating the weight of the each candidate topic-candidate feed pair comprises calculating a number of users who use a homogeneous label of the candidate topic to label the candidate feed.

10. The product of claim 8, where calculating the weight of the each candidate topic-candidate feed pair includes applying a formula $$W = C_1 W_1 + C_2 \frac{k}{k + C_3}$$

where:
W is the weight;
W1 is a relevance weight;
k is the number of times a homogeneous label under the candidate topic is applied to the candidate feed in the topic data; and
C1, C2, and C3 are constants, wherein C1 and C2 are values between 0 and 1, and C3 is a positive number.

11. The product of claim 10, wherein the relevance weight W1 is calculated using formula $$W_1 = \frac{\binom{n}{k} \cdot p_t^k \cdot (1 - p_t)^{n-k} \cdot p_r}{\binom{n}{k} \cdot p_t^k \cdot (1 - p_t)^{n-k} \cdot p_r + \binom{n}{k} \cdot p_s^k \cdot (1 - p_s)^{n-k}}$$

where:
n is a popularity factor;
Pt is a constant that controls a confidence of positive matches;
Ps is a constant that controls a confidence of negative matches; and
Pr is an estimate ratio.

12. The computer program product of claim 11, wherein the popularity factor n is calculated using formula $$n = \text{Max}(P_l \cdot P_e, k)$$

where
Pl is a popularity of the candidate topic; and
Pe is popularity of the candidate feed.

13. The product of claim 8, where the candidate topics are extracted from user created labels.

14. The product of claim 8, wherein the topic data include user-defined relationship between candidate topics and candidate feeds.

15. A system comprising: one or more computers processors configured to perform operations including:
acquiring topic data from a plurality of users, the topic data including candidate feeds and candidate topics;
generating a candidate topic-candidate feed mapping from the topic data, the candidate topic-candidate feed mapping includes candidate topic-candidate feed pairs;
generating topic-feed association rules using the mapping, the topic-feed association rules identifying rules of implication between topics and feeds, wherein generating topic-feed association rules further comprises:
calculating a weight of each candidate topic-candidate feed pair;

applying a threshold to the each candidate topic-candidate feed pair, the threshold representing a level of confidence that in the candidate topic-candidate feed pair, the candidate topic implies the candidate feed; and selecting topic-feed pairs from the candidate topic-candidate feed pairs using the threshold and the weight of the each candidate topic-candidate feed pair; and using the topic-feed association rules to recommend the feeds to a user.

16. The system of claim 15, where calculating the weight of the each candidate topic-candidate feed pair comprises calculating a number of users who use a homogeneous label of the candidate topic to label the candidate feed.

17. The system of claim 15, where calculating the weight of the each candidate topic-candidate feed pair includes applying a formula $$W = C_1 W_1 + C_2 \frac{k}{k + C_3}$$

where:
W is the weight;
W1 is a relevance weight;
k is the number of times a homogeneous label under the candidate topic is applied to the candidate feed in the topic data; and
C1, C2, and C3 are constants, wherein C1 and C2 are values between 0 and 1, and C3 is a positive number.

18. The system of claim 17, wherein the relevance weight W1 is calculated using formula $$W_1 = \frac{\binom{n}{k} \cdot p_t^k \cdot (1 - p_t)^{n-k} \cdot p_r}{\binom{n}{k} \cdot p_t^k \cdot (1 - p_t)^{n-k} \cdot p_r + \binom{n}{k} \cdot p_s^k \cdot (1 - p_s)^{n-k}}$$

where:
n is a popularity factor;
Pt is a constant that controls a confidence of positive matches;
Ps is a constant that controls a confidence of negative matches; and
Pr is an estimate ratio.

19. The system of claim 18, wherein the popularity factor n is calculated using formula $$n = \mathrm{Max}(P_l, P_e, k)$$

where
Pl is a popularity of the candidate topic; and
Pe is popularity of the candidate feed.

20. The system of claim 15, where the candidate topics are extracted from user created labels.

21. The system of claim 15, wherein the topic data include user-defined relationship between candidate topics and candidate feeds.

* * * * *